(12) United States Patent
Chen

(10) Patent No.: US 10,641,319 B2
(45) Date of Patent: May 5, 2020

(54) ELBOW JOINT DEVICE FOR GOAL ASSEMBLING

(71) Applicant: Benjamin Chen, Taichung (TW)

(72) Inventor: Benjamin Chen, Taichung (TW)

( * ) Notice: Subject to any disclaimer, the term of this patent is extended or adjusted under 35 U.S.C. 154(b) by 212 days.

(21) Appl. No.: 15/805,295

(22) Filed: Nov. 7, 2017

(65) Prior Publication Data
US 2019/0136906 A1 May 9, 2019

(51) Int. Cl.
*F16C 11/10* (2006.01)
*A63B 63/00* (2006.01)
*F16C 11/04* (2006.01)

(52) U.S. Cl.
CPC ............ *F16C 11/10* (2013.01); *A63B 63/004* (2013.01); *F16C 11/04* (2013.01); *A63B 2063/002* (2013.01)

(58) Field of Classification Search
CPC .. Y10T 403/32409; F16C 11/10; E04H 15/48; E05D 11/1007; E05D 3/12
See application file for complete search history.

(56) References Cited

U.S. PATENT DOCUMENTS

| | | | | |
|---|---|---|---|---|
| 1,036,222 A * | 8/1912 | Griffenberg | | 403/102 |
| 1,039,986 A * | 10/1912 | Merritt | | 403/61 |
| 4,131,378 A * | 12/1978 | Daws | | E05D 3/12 16/287 |
| 4,437,480 A * | 3/1984 | Husa | | A61H 3/02 135/74 |
| 4,611,945 A * | 9/1986 | Diego | | E06C 1/32 403/102 |
| 4,865,064 A * | 9/1989 | Parsons | | A61H 3/02 135/68 |
| 5,178,583 A * | 1/1993 | Rankin | | B64G 9/00 403/100 |
| 6,353,969 B1 * | 3/2002 | LeMole | | B60J 7/1204 114/361 |
| 6,565,069 B2 * | 5/2003 | Morris | | E04F 11/1836 256/65.15 |
| 6,711,783 B2 * | 3/2004 | LeMole | | B60J 7/1204 114/361 |
| 7,540,472 B2 * | 6/2009 | Striebel | | E04F 11/1812 256/65.07 |
| 9,909,617 B1 * | 3/2018 | Prey | | E05D 11/10 |

FOREIGN PATENT DOCUMENTS

TW     I547248 B     9/2016

* cited by examiner

*Primary Examiner* — Daniel J Wiley
(74) *Attorney, Agent, or Firm* — Alan D. Kamrath; Karin L. Williams; Mayer & Williams PC

(57) ABSTRACT

An elbow joint device applied in goal includes: a first rotation component, a second rotation component and a junction plate. The first and second rotation components which can be inserted into the inner side of goal bar having a first and a second connection component are assembled in the junction plate. The first and second rotation components have a first and a second groove with a first and a second rotation hole passing through. The first and second rotation components pivot on the junction plate via bolts in the first and second rotation holes so that a goal can be unfold or fold by using the elbow joint device.

10 Claims, 11 Drawing Sheets

ELBOW JOINT DEVICE FOR GOAL ASSEMBLING

TECHNICAL FIELD

The present invention relates to an elbow joint device, and more particularly, to an elbow joint device for goal assembling.

BACKGROUND

A conventional goal structure, for example, soccer goal, consists of a couple of different sizes of bars to assemble as a staircase-cutting device. Those bars, mostly combined through welding, and can stand high-speed striking of the ball. However, it is difficult in storage and transportation due to its large size and fixed shape. It is normally placed in fixed position of the field for the players to practice or the games. The players cannot assemble the goal by themselves in places outside the arena.

Recently, some skills are provided to assemble the goal via removable assembly members of goal. These removable assembly members and their connectors can contribute to minimizing space for storing. Moreover, they are easy to carry, so players can practice outside the field by assembling goal on their own. However, the goal made of removable assembly members and connectors still causes some problems, where the steps of assembling and disassembling are too complicated and time-consuming. Usually, it tends to overturn or dismember due to its lower durability.

FIG. 9 shows a schematic view of a conventional ball holder according to a prior art of the invention. As shown in FIG. 9, supports of ball holder 20 have a specific angle of bending to support the base 30. As the result, supports of ball holder 20 with same bending angle should be made in manufacturing process in advance. The angle of these supports 20 is fixed, and cannot be adjusted. On one hand, the size of base 30 corresponding to these supports 20 should be fixed; otherwise, it cannot be put above the supports. On the other hand, supports 20 with bending angle still increases the complexity of storage and transportation.

SUMMARY OF THE INVENTION

In summary, it still lacks a durable structure or a joint device for storage and transportation. Therefore, the purpose of this invention is to provide a device for storage and transportation. In this invention, an elbow joint device for goal assembling is proposed to fold the goal bar. Based on this device, it is convenient to carry or store the goal. In addition, the vulnerability can be improved and the material wear can be reduced during folding or unfolding.

In a first aspect of the invention, an elbow joint device for goal assembling is provided. The elbow joint device at least comprises a first rotation component, a second rotation component and a junction plate. The first rotation component made of plastic comprises a first connection part inserted into the inner side of goal bar, a first groove configured in the first rotation component having a first rotation hole passing through, and a first surface extended from the first groove with at least a first fixing hole. The second rotation component made of plastic on the opposite side of the first rotation component comprises a second connection part inserted into the inner side of goal bar, a second groove configured in the second rotation component having a second rotation hole passing through, and a second surface extended from the second groove having at least a second fixing hole. The junction plate made of metal coupled to the first, second surface having a plurality of plate hole corresponding to the first, second rotation hole and the first, second fixing hole. In addition, the first and the second rotation component are reversing components. The junction plate is in the first and the second groove via bolts passing through the first, second rotation hole that enables the first or the second rotation component to selectively rotate or be fixed in a specific angle, facilitating folding or unfolding of goal bar by initiating the first, second rotation component. The junction plate has an end stop to limit the specific angle of the rotation of the first, second rotation component. Using the metal junction plate and the plastic first, second surface decreases the consumption of material produced by relative motion of the metal junction plate and the plastic first, second surface. Moreover, a pre-processing of goal bar for connection is processed before inserting the first, second connection part into the inner of goal bar, inserting bolts into the first, second rotation hole, rotating the first, second rotation component to the specific angle, and fastening the first, second rotation component.

In a second aspect of the invention, an elbow joint device for ball holder assembling is proposed. The elbow joint device at least comprises a first rotation component, a second rotation component and a junction plate. The first rotation component made of plastic comprises a first connection part connected to a support of ball holder, a first groove configured in the first rotation component having a first rotation hole passing through, and a first surface extended from the first groove. The second rotation component made of plastic on the opposite side of the first rotation component comprises a second connection part connected to a support of ball holder, a second groove configured in the second rotation component having a second rotation hole passing through, and a second surface extended from the second groove. The junction plate made of metal coupled to the first, second surface having a plurality of plate hole corresponding to the first, second rotation hole. In addition, the first and the second rotation component are reversing components. The junction plate is in the first and the second groove via bolts passing through the first, second rotation hole, for enabling the first or the second rotation component to selectively rotate or to be fixed in a specific angle facilitating folding or unfolding of support of ball holder by initiating the first, second rotation component. The junction plate has an end stop to limit the specific angle of the rotation of the first, second rotation component. Using the metal junction plate and the plastic first, second surface decreases the consumption of material produced by relative motion of the metal junction plate and the plastic first, second surface.

In a third aspect of the invention, a method for an elbow joint device is first inserting a first, second connection part of an elbow joint device into the inner of goal bar. Next, inserting a plurality of bolt into a first, second rotation hole of the elbow joint device. Then, it is rotating a first, second rotation component of the elbow joint device to a specific angle. Finally, the first, second rotation component are fixed.

According to one aspect, the first, second rotation component rotate to a first location that enables the goal bar to rotate for forming the first, second rotation component and the goal bar in a line. In addition, the first, second fixing holes are inserted by bolts to fasten the line of first, second rotation component and the goal bar and to keep the line straight.

According to one aspect, the first, second rotation component rotate to a second location that enables the goal bar to rotate for forming the first, second rotation component and the goal bar in a folding state.

According to one aspect, the first, second rotation component further comprises a case configured out of the first, second rotation component to protect the elbow joint device.

According to one aspect, the pre-processing of goal bar for connection comprises cutting the goal bar in a manner of different length or drilling holes for connecting the elbow joint device to the goal bar.

According to one aspect, the method for an elbow joint device comprises rotating the first, second rotation component to a first location, then initiating a rotation of goal bar via the first, second connection part and forming a line, finally fastening the line and keeping the line straight by inserting bolts into the first, second fixing holes.

According to one aspect, the method for an elbow joint device comprises folding the goal bars that applied the elbow joint device to a specific angle selected by a user, and carrying or storing the goal bars by staggering folded goal bar.

A detailed description is given in the following embodiments with reference to the accompanying drawings.

BRIEF DESCRIPTION OF THE DRAWINGS

The components, characteristics and advantages of the present invention may be understood by the detailed descriptions of the preferred embodiments outlined in the specification and the drawings attached. Embodiments of the invention are illustrated by way of example, and not by way of limitation, in the figures of the accompanying drawings in which like reference numerals refer to similar elements.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
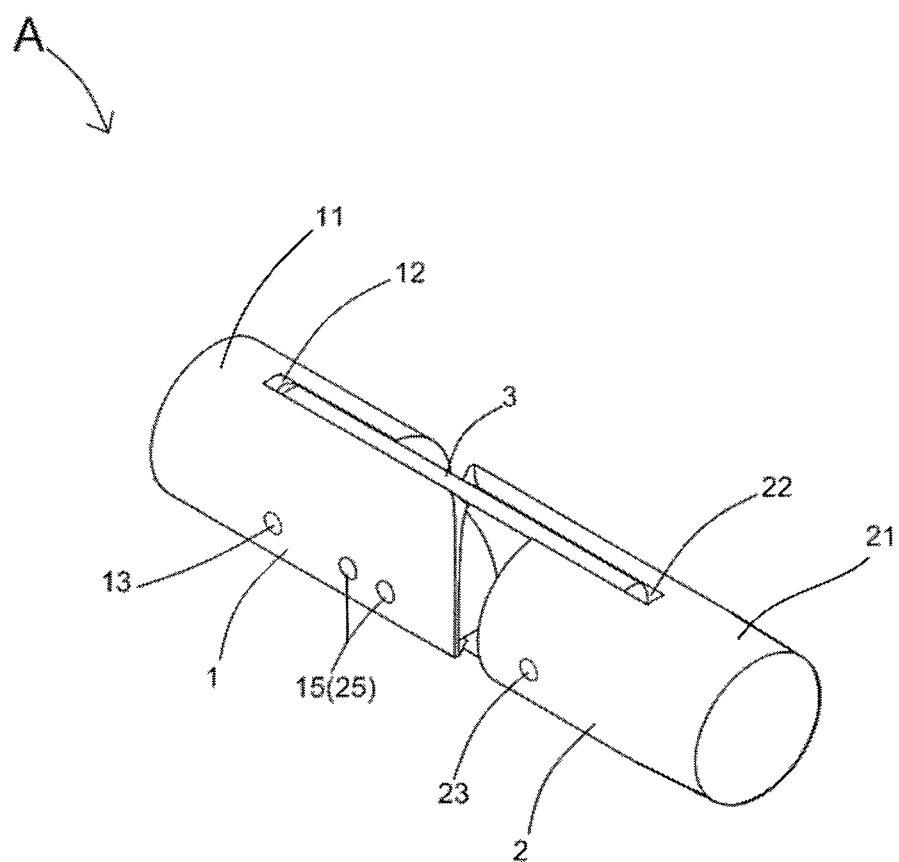
FIG. 1 shows a schematic view of an elbow joint device according to an embodiment of the invention.
Figure 2:
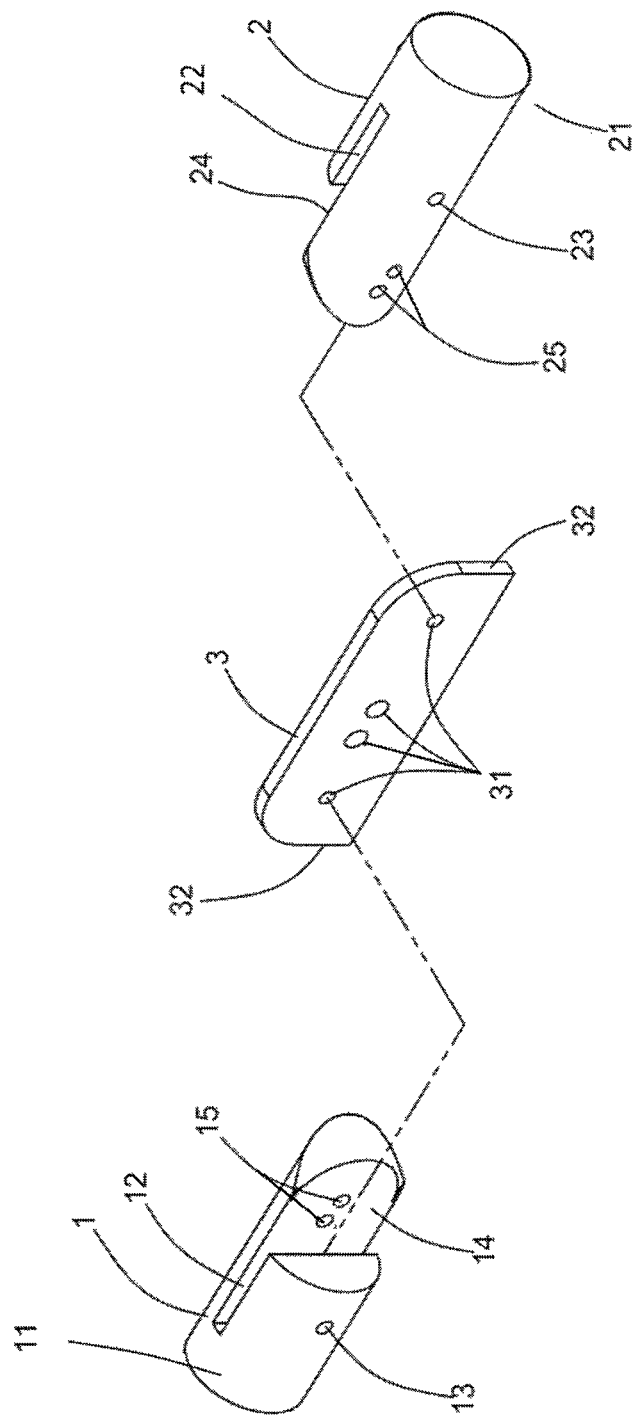
FIG. 2 shows an exploded view of an elbow joint device according to an embodiment of the invention.

FIG. 1 shows a schematic view of an elbow joint device according to an embodiment of the invention. As shown in FIG. 1, the elbow joint device of the invention can be applied to goal assembling, and mainly consists of a first rotation component 1, a second rotation component 2, and a junction plate 3. FIG. 2 shows an exploded view of an elbow joint device according to an embodiment of the invention. Referring to FIG. 2, in one embodiment, junction plate 3 can be assembled in the first rotation component 1. The first rotation component 1 has a first connection part 11 which can be inserted into the inner of goal bar. The first rotation component 1 also has a first groove 12 where the first rotation hole 13 passing through. A first surface 14 having a first fixing hole 15 is in front of the first rotation component 1, and is extended from the first groove 12. In other embodiment, the first surface 14 is made of material with high rubbing resistance, for example, plastics, but not limited to plastics; the material corresponding to usage condition can be selected by users.

For the purpose of connection of the elbow joint device and the goal bar, the goal bar, usually iron pipes, can be processed in advance for joining or pipe coupling. The pre-processing of goal bar comprises cutting the goal bar in a manner of different length or drilling holes for connecting the elbow joint device to the goal bar, or other effective methods for connection.

Referring to FIG. 2, in one embodiment, to effectively fix the first rotation component 1, the second rotation component 2, and the junction plate 3, or to reinforce the connection, the number of first fixing hole 15 is not limited to one. For example, rather than one fixing hole with unnecessary jiggle, the number of first fixing hole 15 can be two, symmetrically configured in the first surface 14.

Referring to FIG. 2, in one embodiment, the first connection part 11 of the first rotation component 1 is plastics, for example, thermoplastic. In a preferred embodiment, the first rotation component 1 is a long plastic pipe and formed as a single piece. So the first surface 14 and the first connection part 11 are plastic pipes and belong to one piece as well. On one hand, the above setting is to increases solidity of the elbow joint device. On the other hand, the first surface 14 constructed by plastics has the utility of anti-rusting and a lower friction force between the first rotation component 1 and the junction plate 3 to increases the service life of the elbow joint device. To be noted, the first connection part 11 can be a single long plastic pipe, but not limited to the length and shape, other length or shape of the first connection part 11 is possible to increases the stability of the elbow joint device.

Referring to FIG. 2, the second rotation component 2 configured in the junction plate 3 is on the opposite side of the first rotation component 1. The first and the second rotation component are reversing components. The second rotation component 2 has a second connection part 21 which can be inserted into the inner side of goal bar. The second rotation component 2 also has a second groove 12 where the second rotation hole 23 passing through. A second surface 24 having a second fixing hole 25 is in front of the second rotation component 2, and is extended from the second groove 22. In other embodiment, the second surface 24 is made of material with high rubbing resistance, for example, plastics, but not limited to plastics; the material corresponding to usage condition can be selected by users.

Referring to FIG. 2, in one embodiment, to effectively fix the first rotation component 1, the second rotation component 2, and the junction plate 3, or to reinforce the connection, the number of second fixing hole 25 is not limited to one. For example, rather than one fixing hole with unnecessary jiggle, the number of first fixing hole 25 can be two, symmetrically configured in the second surface 24. To be noted, in this embodiment, a plurality of holes should be processed in the junction plate 3 corresponding to first fixing holes 15 and second fixing holes 15.

Referring to FIG. 2, in one embodiment, the second connection part 21 of the second rotation component 2 is plastics, for example, thermoplastic. In a preferred embodiment, the second rotation component 2 is a long plastic pipe and formed as a single piece. So the second surface 24 and the second connection part 21 are plastic pipe and belong to one piece as well. On one hand, the above setting is to increases solidity of the elbow joint device. On the other hand, the second surface 24 constructed by plastics has the utility of anti-rusting and a lower friction force between the second rotation component 2 and the junction plate 3 to increases the service life of the elbow joint device. To be noted, the second connection part 21 can be a single long plastic pipe, but not limited to the length and shape, other length or shape of the second connection part 21 is possible to increases the stability of the elbow joint device.

Referring to FIG. 2, in one embodiment, the junction plate 3 couples to the first surface 14 and second surface 24 for connecting the first rotation component 1 and the second rotation component 2. The junction plate 3 has plate holes 31 corresponding to the first, second rotation hole 13, 23 and the first, second fixing hole 15, 25. The junction plate is inserted into the first and the second groove 12, 22 via bolts passing through the first, second rotation hole. The selective rotation or the fixed location in a specific angle of the first rotation component 1 and the second rotation component 2 facilitates folding or unfolding of goal bar by initiating the first, second rotation component 1,2.

Referring to FIG. 2, in one embodiment, the junction plate 3 can be a rectangle platelet. In a preferred embodiment, the two corners of rectangle platelet have arc to facilitate rotation of the first and second rotation component 1, 2; other corners are with right angles. The junction plate 3 has an end stop 32 due to these right angles. Therefore, the end stop 32 can limit the rotation angle of the first, second rotation component 1, 2. Based on the rotation of the first, second rotation component 1, 2, the goal bars can be folded or unfolded.

Referring to FIG. 2, in one embodiment, the junction plate 3 made of metal and the first, second rotation component 1, 2 made of plastics are assembled. The combination of plastics and metal can reduce wear produced by relative motion between plastics and metal. In addition, under the effect of relative motion, it causes slight wearing between the junction plate 3 and first surface 14 as well as the junction plate 3 and second surface 24. Such slight wearing may not affect the operation of junction plate 3. In other words, the junction plate 3 is sturdy and durable under the relative motion.

Figure 3:
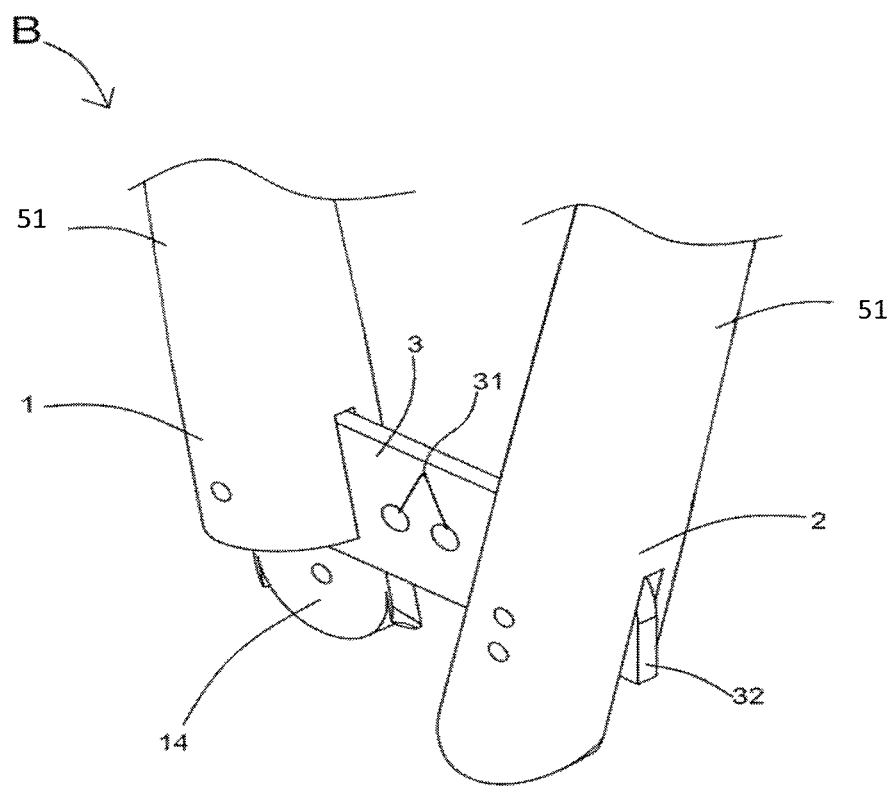
FIG. 3 shows a schematic view of the second location according to an embodiment of the invention.

FIG. 3 shows a schematic view of the second location according to an embodiment of the invention. Referring to FIG. 1-3, the operation of an elbow joint device is further illustrated. First, the first location A is defined as a straight line state which means the first rotation component 1, the second rotation component 2, and the junction plate 3 are in the same straight line when unfolding the goal. The second location B is defined as a folding state when folding the goal bar for storing. Because the folded goal bars are staggered, leading to reduction in volume, the goal is easy to carry or store.

Figure 4:
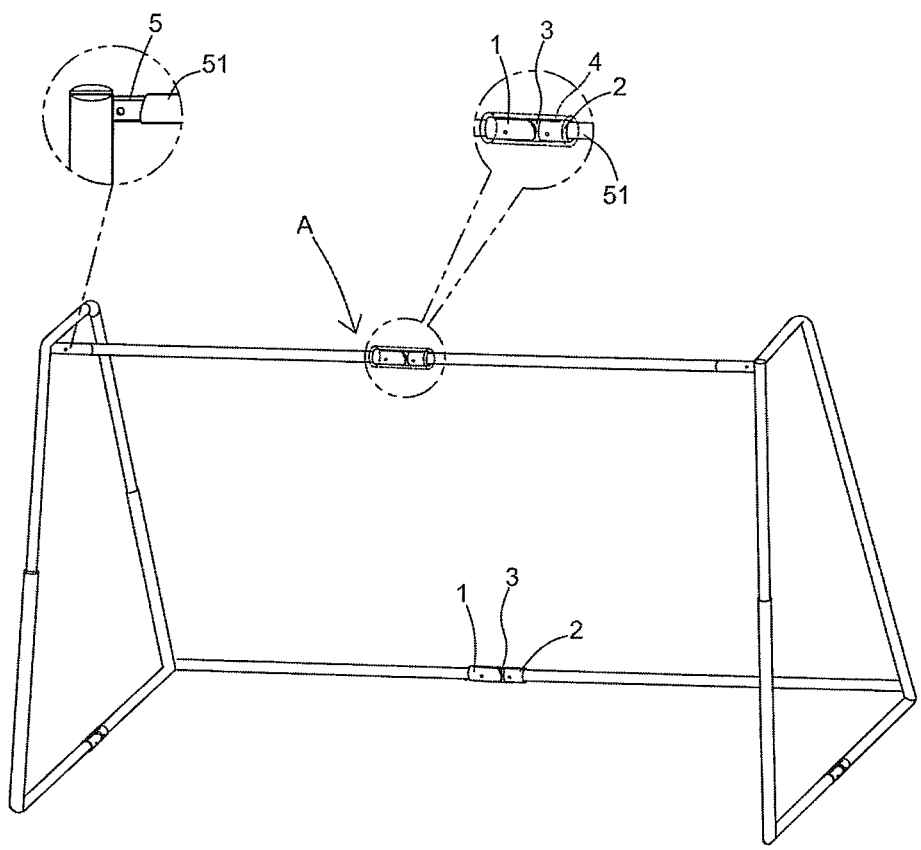
FIG. 4 illustrates a schematic view of an elbow joint device applying to soccer goal according to an embodiment of the invention.

FIG. 4 illustrates a schematic view of an elbow joint device applying to soccer goal according to an embodiment of the invention. In one embodiment, the goal bar has some swivel connectional fittings 5. Swivel connectional fitting 5 is a conventional skill for connecting goal bars. The goal bar 51, usually at least one meter, is assembled to the goal by the swivel connectional fitting 5, and the elbow joint device of the invention is assembled in the other side of the swivel connectional fitting 5. In this embodiment, the elbow joint device is installed in the lintel of goal (the longest of goal bar 51) and the bottom side of goal bar 51 which touches ground.

Figure 5:
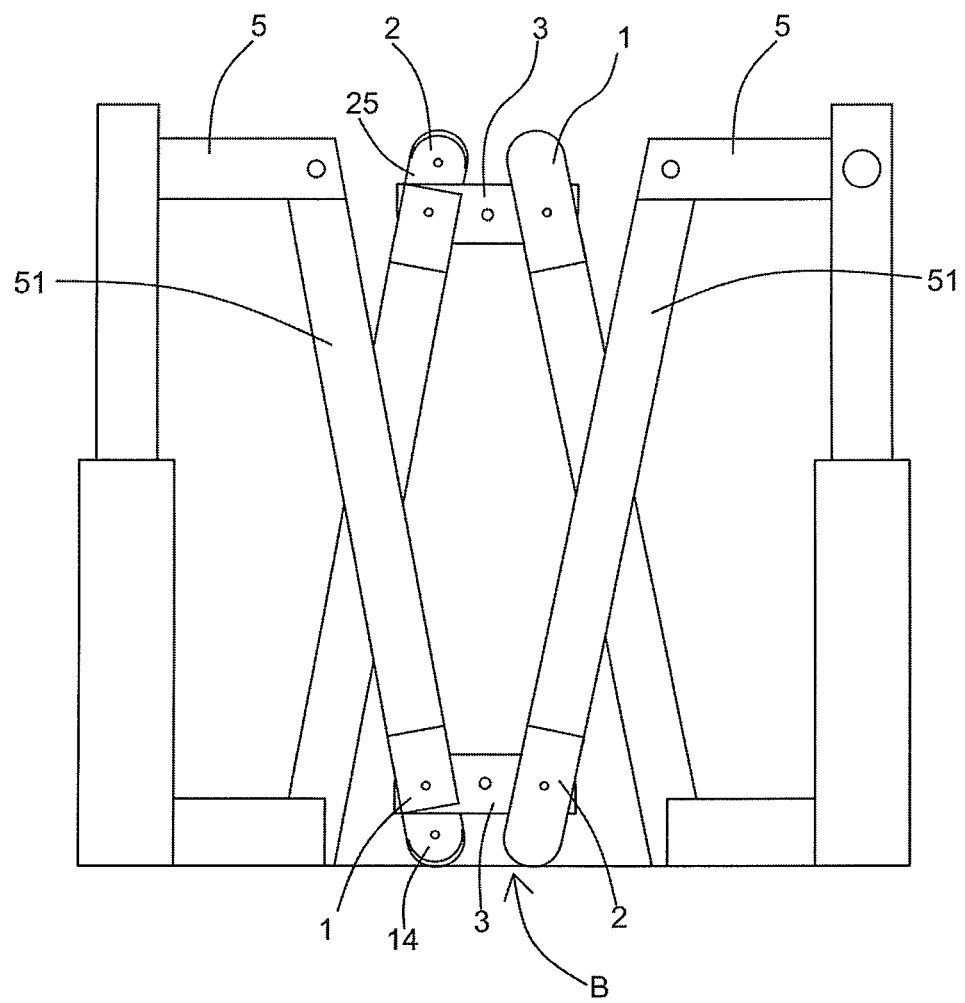
FIG. 5 illustrates a schematic view of an elbow joint device applying to soccer goal for folding according to an embodiment of the invention.

FIG. 5 illustrates a schematic view of an elbow joint device applying to soccer goal for folding according to an embodiment of the invention. Referring to FIG. 5, in one embodiment, when unfolding the goal, one can rotate the first rotation component 1 and the second rotation component 2 to the first location A, which means first connection part 11 and second connection part 21 are also in the straight line. (as shown in FIG. 1) Therefore, the goal bar 51 rotates to the first location A by initiating first connection part 11 and second connection part 21. Then, the first and second fixing holes 15, 25 are inserted by bolts for fastening the line of first connection part 11, second connection part 21 and goal bar 51 and keeping the line straight.

Referring to FIG. 5, in one embodiment, the elbow joint device can comprises a case 4 out of the first and second rotation component 1, 2 to protect the elbow joint device. The case 4 made of metal is used to fix the elbow joint device and to reduce the wear of the first and second rotation component 1, 2. For example, the case 4 can be a sliding iron pipe covering the first and second rotation component 1, 2. Moreover, the case 4 can be locked in the first and second rotation component 1, 2 with junction plate 3 via male and female screw. In a preferred embodiment, the case 4, a sliding iron pipe, has already fixed the first and second rotation component 1, 2 as a line, so it is not necessary to insert bolts into the first and second fixing holes 15, 25 for fixing.

Referring to FIG. 5, in one embodiment, in some situation, players used to hold the goal bar for defending; hence, the case 4 can be wrapped by a cover to protect the elbow joint device and goal bar 51. After setting the cover, the goal toppled caused by excessive holding can be avoid.

Figure 6:
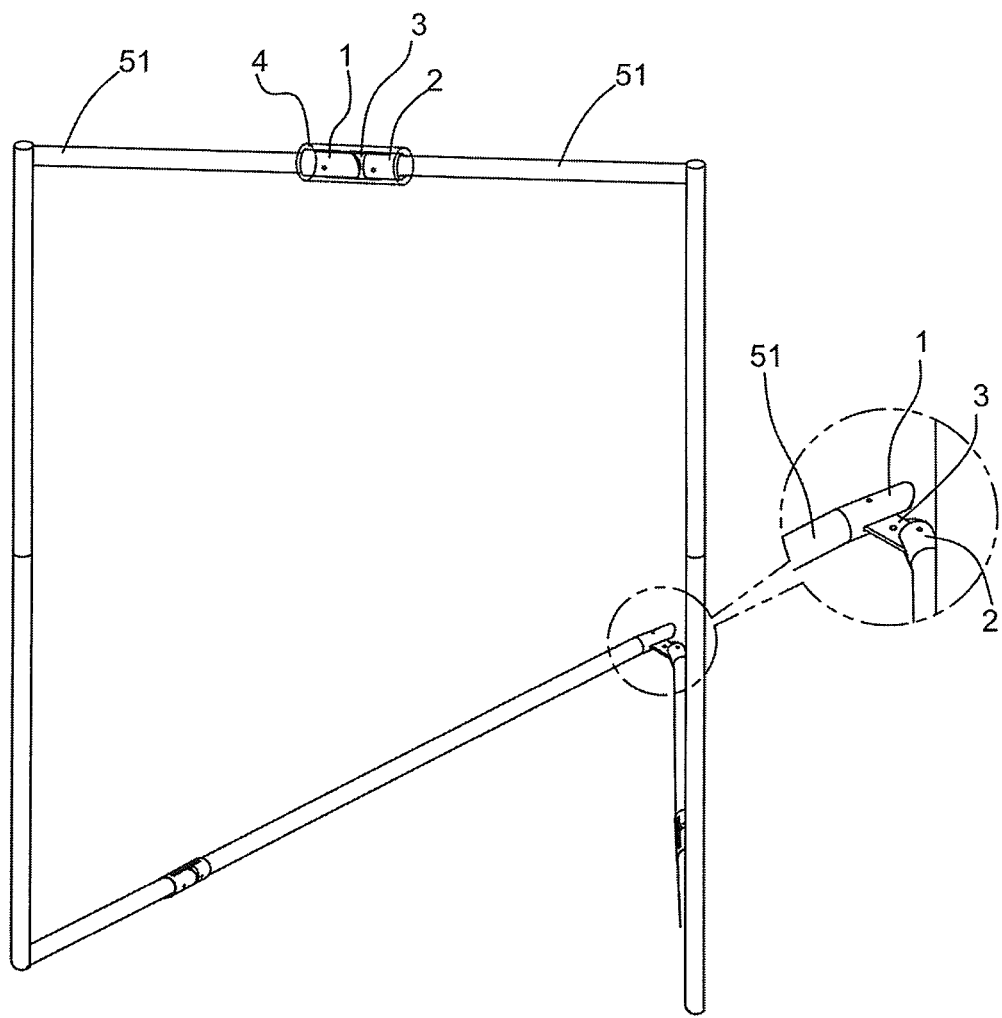
FIG. 6 illustrates a schematic view of an elbow joint device applying to field hockey goal according to an embodiment of the invention.

Referring to FIG. 5, in one embodiment, when folding the goal for store, first loose bolts in the first and second fixing holes 15, 25 (dismantle the case 4 if necessary) and rotate the first and second rotation component 1, 2 to the second location B. The goal bars 51 forms a V-shape folding by initiating rotation of the first connection part 11 and second connection part 21. And both flanks of goal post and rear goal bars 51 forms an A-shape folding. In one embodiment, goal bars 51 are folded to specific angles by users via elbow joint devices. Then, folded goal bars are staggered front and rear to reduce the volume of goal for facilitating transportation and storage. As the result, the volume of soccer goal can be greatly reduced by the staggered folding to save space for other use or to move to other place due to adverse weather conditions FIG. 6 illustrates a schematic view of an elbow joint device applying to field hockey goal according to an embodiment of the invention. In one embodiment, the goal of field hockey forms an upside-down u shape in the front side and a triangle shape in the rear side arranged by goal bar 51. Not only soccer goal, but an elbow joint device of the invention can be also applied to field hockey goal. The goal bar of hockey can form the first location A through the elbow joint device, and the goal bars with triangle shape of rear side can be made by rotating the first and second rotation component 1, 2 of elbow joint device to a specific angle. After training or game, goal bars can be folded by rotating the first and second rotation component 1, 2 to the second location B.

Figure 7:
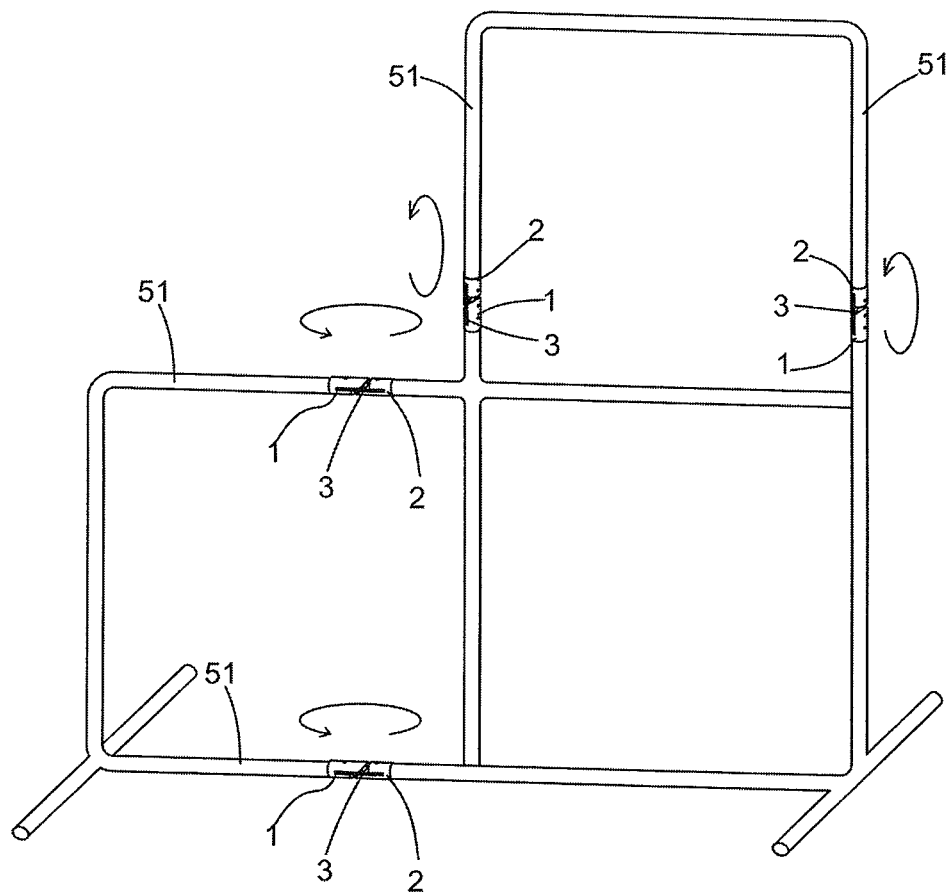
FIG. 7 illustrates a schematic view of an elbow joint device applying to baseball training net according to an embodiment of the invention.

FIG. 7 illustrates a schematic view of an elbow joint device applying to baseball training net according to an embodiment of the invention. In one embodiment, an elbow joint device of the invention can be applied to baseball training net. The training net is mainly used to train the pitch location or hit direction. Elbow joint devices of the invention are separately assembled on different bars of net holder. Elbow joint devices installed as vertical direction enable vertical folding or unfolding, and horizontal folding or unfolding as horizontal direction Referring to FIGS. 1-3 and the corresponding description of those figures above, the present invention can be applied to assembly of ball holder. To be noted, the size or volume of the elbow joint device is not limited under the scope and spirit of the present invention. For example, the elbow joint device used in goal assembly is possibly bigger than used in ball holder assembly. In one embodiment, first connection part 11 and second connection part 21 of elbow joint device connect to the support of ball holder, that enables the support to bend as an angle set by a user for loading the base of ball holder. Because the bending angle of support can be set, different size of base of ball holder can be applied.

Figure 10:
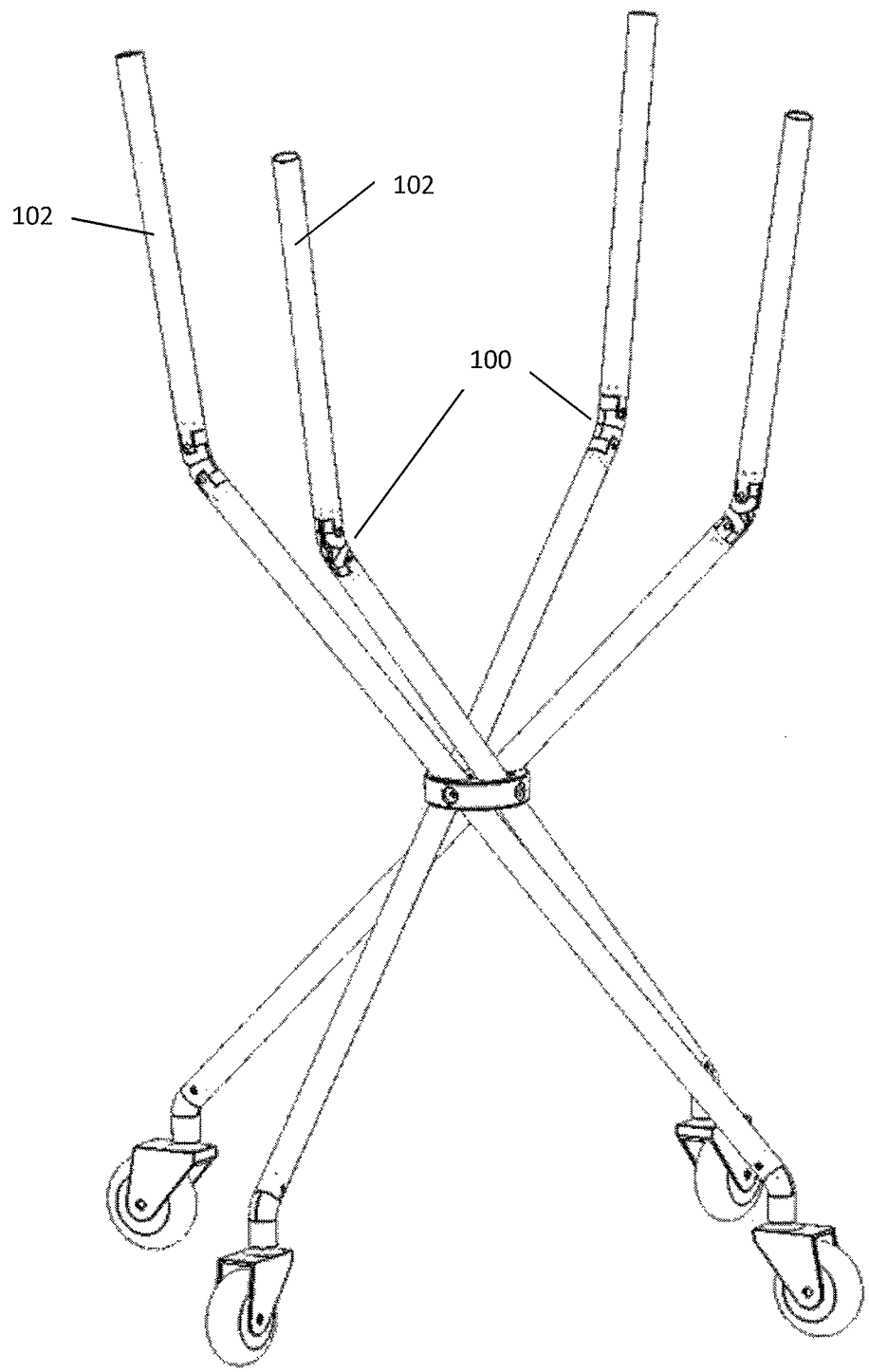
FIG. 10 illustrates a schematic view of an elbow joint device applying to ball holder according to an embodiment of the invention.

FIG. 10 illustrates a schematic view of an elbow joint device applying to ball holder according to an embodiment of the invention. Referring to FIG. 1 and FIG. 10, in one embodiment, the supports of ball holder 102 are connected to the elbow joint device 100, which enables the supports 102 to bend as an angle set by a user for loading the base of ball holder. If the volume of base is too big, the bending angle of support 102 can be increased by rotating the first and second rotation component 1, 2 of elbow joint device. In other words, the supports of ball holder 102 fit different base of ball holder.

Figure 11:
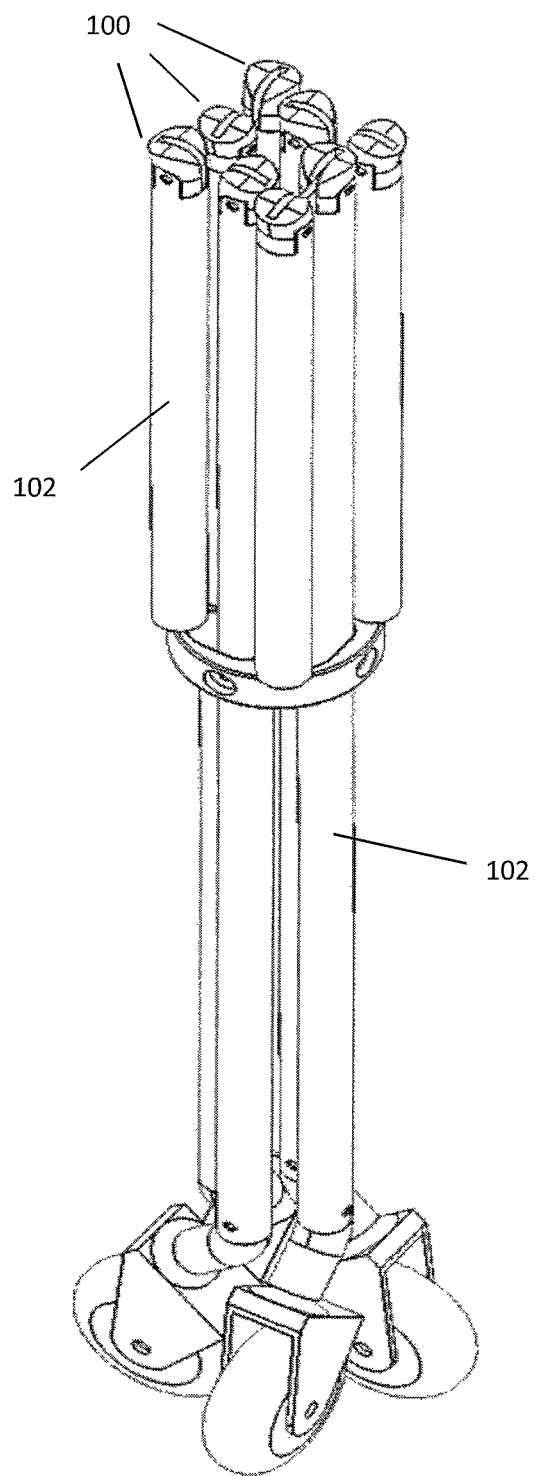
FIG. 11 illustrates a schematic view of an elbow joint device applying to ball holder for storing according to an embodiment of the invention.

FIG. 11 illustrates a schematic view of an elbow joint device applying to ball holder for storing according to an embodiment of the invention. Referring to FIG. 11, in one embodiment, the supports of ball holder 102 are connected to the elbow joint device 100, which enables the supports 102 to bend as an angle set by a user. For transportation or storage, a bending with large angle is possible. For example, rotate one support 102 in clockwise direction until two supports 102 are totally parallel. In the embodiment, the length and width of ball holder are reduced due to parallel supports 102 facilitating storage, carrying and transportation.

Figure 8:
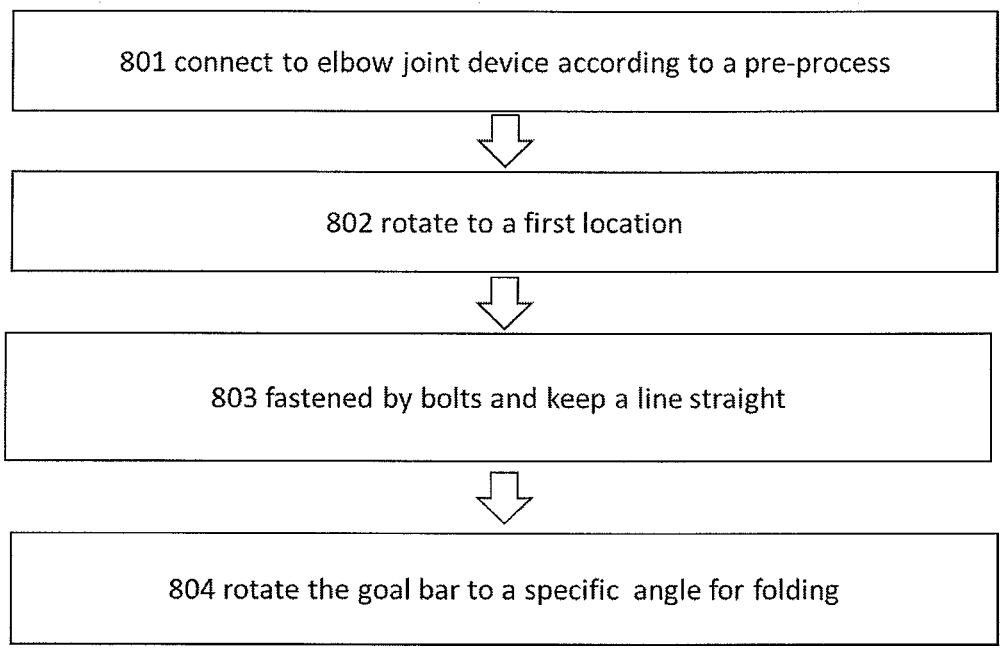
FIG. 8 illustrates a process for using an elbow joint device according to an embodiment of the invention.
Figure 9:
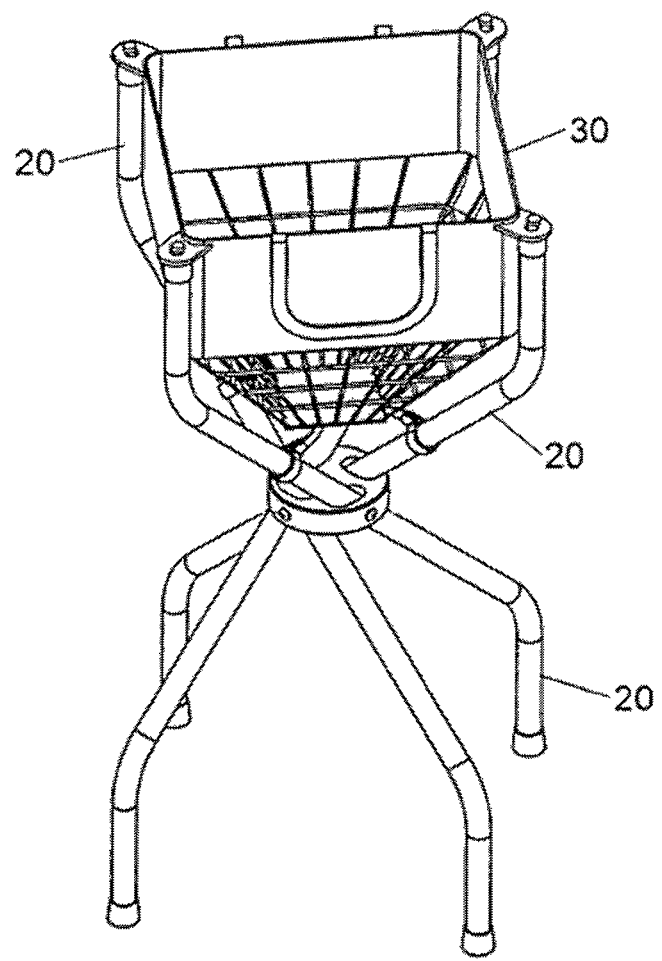
FIG. 9 shows a schematic view of a conventional ball holder according to a prior art of the invention.

FIG. 8 illustrates a process for using an elbow joint device according to an embodiment of the invention. Referring to FIG. 8 corresponding to FIG. 1-4, in one embodiment, A method for an elbow joint device for folding is provided. As shown in step 801, the goal bar, usually iron pipes, can be processed in advance for joining or pipe coupling. The pre-processing of goal bar comprises cutting the goal bar in a manner of different length, drilling holes for connecting the elbow joint device to the goal bar, or other effective methods for connection. As shown in step 802, in one embodiment, one can rotate the first rotation component 1 and the second rotation component 2 with rotation of goal bar to the first location A which means first connection part 11 and second connection part 21 are in the straight line. (as shown in FIG. 1) As shown in step 803, in one embodiment, the first and second fixing holes 15, 25 are inserted by bolts for fastening the line of first connection part 11, second connection part 21 and goal bar 51 and keeping the line straight. As shown in step 804, in one embodiment, one can rotate the goal bar to a specific angle for folding. The goal bars 51 are folded to specific angles by users via elbow joint devices. Therefore, folded goal bars 51 are staggered to reduce the volume of goal for facilitating transportation and storage.

The main contributions of this invention are summarized as follows:
(a) The present invention, applying in various kinds of sports, eliminates the inconvenience brought forth from conventional skill of the welding combination of the goal structure.
(b) The present invention leads to easy folding or unfolding, transportation, immediate use of the goal, which makes its best use in the activity fields, such as holding three or more than three contests in one filed.
(c) The present invention enables the elbow joint device to cover plastic on the outer layer with metal production, without causing tilting or dismantling of the goal under impacts from balls.
(d) The present invention has contributed to lowering the possibility of wearing from material frictions compared with prior art, and the device body stays intact.
(e) The present invention which applies in assembling of the ball holder structure enables the ball holder much easier to carry and transport, with multi-spec suitability.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. An elbow joint device for goal assembling comprising:
    a first rotation component made of plastic comprising:
        a first connection part inserted into an inner portion of a first goal bar;
        a first groove having a first rotation hole passing therethrough; and
        a first surface extended from a side of said first groove and having at least a first fixing hole;
    a second rotation component made of plastic opposite said first rotation component comprising:
        a second connection part inserted into an inner portion of a second goal bar;
        a second groove having a second rotation hole passing therethrough; and
        a second surface extended from a side of said second groove and having at least a second fixing hole; and
    a junction plate made of metal coupled to said first and second surfaces, and having a plurality of plate holes corresponding to said first and second rotation holes and said first and second fixing holes;
    wherein said first and second surfaces engage with opposing sides of said junction plate, and said junction plate is received in said first and second grooves via bolts passing through said first rotation hole and said plate hole as well as said second rotation hole and said plate hole, for enabling said first or said second rotation component to selectively rotate to or be fixed in a specific angle facilitating folding or unfolding of said first and second goal bars, wherein said junction plate has an end stop to limit said specific angle of rotation of said first and second rotation components, wherein the combination of said metal junction plate and said plastic first and second surface reduces the wear of material produced by relative motion of said metal junction plate and said plastic first and second surface, and a pre-processing of said first and second goal bars for connection is processed before inserting said first and second connection part into the inner sides of said goal bars, inserting bolts into said first and second rotation holes, rotating said first and second rotation components to said specific angle, and fastening said first and second rotation components.

2. The device of claim 1, wherein said first and second rotation component rotate to a first location, enabling the goal bar to rotate for forming said first and second rotation component and the goal bar in a line, and wherein said first and second fixing holes are inserted by bolts for fastening said line and keep said line straight.

3. The device of claim 1, wherein said first and second rotation component rotate to a second location, enabling the goal bar to rotate for forming said first and second rotation component and the goal bar in a folding state.

4. The device of claim 3, said first and second rotation components further comprise a case configured to surround said first and second rotation component to protect said elbow joint device.

5. The device of claim 1, said pre-processing of goal bar for connection comprises cutting the goal bar in a manner of different length or drilling holes for connecting said elbow joint device to the goal bar.

6. A method for producing the elbow joint device of claim 1, the method comprising:
    inserting the first and second connection part into the inner sides of first and second goal bars;
    inserting a plurality of bolt into the first and second rotation holes of said elbow joint device;
    rotating the first and second rotation component to a specific angle; and
    fastening said first and second rotation component.

7. The method of claim 6, wherein said method comprises:
    rotating said first and second rotation component to a first location;
    initiating a rotation of goal bar via said first and second connection part and forming a line; and
    fastening said line and keeping said line straight by inserting bolts into said first and second fixing holes.

8. The method of claim 6, wherein said method comprises providing a case surrounding said first and second rotation component to protect said elbow joint device.

9. The method of claim 6, wherein said method comprises:
    folding the goal bars applied to said elbow joint device to a specific angle selected by a user; and
    carrying or storing the goal bars by staggering the folded goal bar.

10. An elbow joint device for ball holder assembling comprising:
    a first rotation component made of plastic comprising:
        a first connection part connected to a support of a first ball holder;
        a first groove having a first rotation hole passing therethrough; and
        a first surface extended from a side of said first groove;
    a second rotation component made of plastic opposite said first rotation component comprising:
        a second connection part connected to a support of a second ball holder;
        a second groove having a second rotation hole passing therethrough; and
        a second surface extended from a side of said second groove; and a junction plate made of metal coupled to said first and second surfaces, and having a plurality of plate hole corresponding to said first and second rotation hole;

wherein said first and second surfaces engage with opposing sides of said junction plate, and said junction plate is received in said first and second groove via bolts passing through said first rotation hole and said plate hole as well as said second rotation hole and said plate hole, for enabling said first or said second rotation component to selectively rotate to or be fixed in a specific angle facilitating bending of said support of ball holder with different angles, wherein said junction plate has an end stop to limit said specific angle of rotation of said first and second rotation component, and wherein the combination of said metal junction plate and said plastic first and second surface reduces the wear of material produced by relative motion of said metal junction plate and said plastic first and second surface.

* * * * *